(12) United States Patent
Cooper

(10) Patent No.: US 7,919,157 B2
(45) Date of Patent: Apr. 5, 2011

(54) VACUUM IG WINDOW UNIT WITH METAL MEMBER IN HERMETIC EDGE SEAL

(75) Inventor: David J. Cooper, Canton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 657 days.

(21) Appl. No.: 11/651,619

(22) Filed: Jan. 10, 2007

(65) Prior Publication Data

US 2008/0166570 A1    Jul. 10, 2008

(51) Int. Cl.
*E06B 3/24* (2006.01)
*E04C 2/54* (2006.01)

(52) U.S. Cl. .................................. 428/34; 52/786.13

(58) Field of Classification Search .............. 428/34; 52/786.1, 786.13
See application file for complete search history.

(56) References Cited

U.S. PATENT DOCUMENTS

| | | | | |
|---|---|---|---|---|
| 2,977,722 | A | * | 4/1961 | Mazzoni ............................ 65/23 |
| 3,990,201 | A | * | 11/1976 | Falbel ............................ 52/171.3 |
| 4,286,743 | A | * | 9/1981 | Vasseur et al. ............. 228/124.1 |
| 4,393,105 | A | * | 7/1983 | Kreisman ....................... 428/34 |
| 4,928,448 | A | * | 5/1990 | Phillip ............................ 52/179 |
| 5,124,185 | A | * | 6/1992 | Kerr et al. ....................... 428/34 |
| 5,643,644 | A | * | 7/1997 | Demars ............................ 428/34 |
| 5,657,607 | A | | 8/1997 | Collins et al. |
| 5,664,395 | A | | 9/1997 | Collins et al. |
| 5,902,652 | A | | 5/1999 | Collins et al. |
| 6,291,036 | B1 | * | 9/2001 | Wang et al. .................... 428/34 |
| 6,399,169 | B1 | | 6/2002 | Wang et al. |
| 6,444,281 | B1 | | 9/2002 | Wang et al. |
| 6,503,583 | B2 | | 1/2003 | Nalepka et al. |
| 6,541,083 | B1 | | 4/2003 | Landa et al. |
| 6,635,321 | B2 | | 10/2003 | Wang et al. |
| 6,641,689 | B1 | | 11/2003 | Aggas |
| 6,692,600 | B2 | | 2/2004 | Veerasamy et al. |
| 6,701,749 | B2 | | 3/2004 | Wang et al. |

FOREIGN PATENT DOCUMENTS

| | | |
|---|---|---|
| CA | 1 290 624 | 10/1991 |
| EP | 0 421 239 | 4/1991 |
| GB | 2 261 247 | 5/1993 |

* cited by examiner

*Primary Examiner* — Donald Loney
(74) *Attorney, Agent, or Firm* — Nixon & Vanderhye P.C.

(57) ABSTRACT

A vacuum insulating glass (IG) unit and/or a method of making the same is/are provided. In certain example embodiments, the edge seal includes at least one metal member located between the opposing substrates (e.g., glass substrates). The at least one metal member may be bonded to the glass substrate(s) via a bonding material such as solder glass, frit and/or the like. The provision of the at least one metal member in the edge seal, between and/or exterior the glass substrates, is advantageous in that this provides for a more flexible edge seal permitting more give and take during window flexing in different environmental conditions. The additional flexibility of the edge seal may reduce the amount of optical distortion caused by flexing of the window, and/or the likelihood of window breakage in certain environmental conditions.

10 Claims, 3 Drawing Sheets

VACUUM IG WINDOW UNIT WITH METAL MEMBER IN HERMETIC EDGE SEAL

This invention relates to a vacuum insulating glass (IG) unit, and a method of making the same. More particularly, this invention relates to a vacuum IG unit including at least one metal member in an edge seal thereof.

BACKGROUND OF THE INVENTION

Vacuum IG (VIG) units are known in the art. For example, see U.S. Pat. Nos. 5,664,395, 5,657,607, 6,399,169, 6,641,689, 6,692,600 and 5,902,652, the disclosures of which are all hereby incorporated herein by reference.

Prior art FIGS. 1-2 illustrate a conventional vacuum IG unit. IG unit 1 includes two spaced apart sheets of glass 2 and 3 which enclose an evacuated or low pressure space 6 therebetween. Glass sheets 2 and 3 are interconnected by peripheral or edge seal of fused solder glass 4 and an array of support pillars or spacers 5.

Pump out tube 8 is sealed by solder glass 9 to an aperture or hole 10 which passes from an interior surface of glass sheet 2 to the bottom of recess 11. A vacuum is attached to tube 8 so that the cavity between sheets 2 and 3 can be evacuated to create a low pressure area 6 between the opposing glass substrates. After evacuation, tube 8 is melted to seal the vacuum. Recess 11 retains melted and sealed tube 8. Chemical getter 12 may be included within machined recess 13. Alternatively, although not shown, the pump-out tube or hole may be located in the edge seal instead of in one of the glass substrates 2, 3.

In prior art FIGS. 1-2, edge seal 4 is made entirely from solder glass. For example, see U.S. Pat. No. 5,902,652. As explained in the '652 patent, the solder glass edge seal is formed by depositing the solder glass as a liquid slurry onto the surface of one or both of the glass sheets 2, 3. The glass sheets 2 and 3 are then brought together and the entire unit is then heated to a temperature at which the solder glass melts, wets the surface of the glass sheets, and flows to produce a hermetic edge seal 4 between the glass sheets 2 and 3.

Unfortunately, the edge seal 4 of FIGS. 1-2, made entirely of solder glass and directly contacting both glass substrates, is disadvantageous in certain situations. During many environmental conditions in which the VIG unit may be used (e.g., during hot, cold, and/or windy conditions), there tends to be much flexing of the vacuum IG window unit. The nature of the edge seal 4 in FIGS. 1-2 causes such flexing to distort the optics of the window unit, and breakage of the window unit is even possible in extreme conditions.

It is apparent from the above that there exists a need in the art for a vacuum IG unit, and corresponding method of making the same, including an improved edge seal between opposing glass sheets or substrates.

This invention will now be described with respect to certain embodiments thereof, accompanied by certain illustrations.

SUMMARY OF EXAMPLE EMBODIMENTS OF THE INVENTION

In certain example embodiments of this invention, there is provided a vacuum IG window unit including at least one metal member in an edge seal thereof, and/or a method of making the same.

In certain example embodiments, the edge seal includes at least one metal member located between the opposing substrates (e.g., glass substrates). In certain example embodiments, the metal member need not directly contact the glass substrates. In certain example embodiments, the at least one metal member is bonded to the glass substrate(s) via a bonding material such as solder glass, frit and/or the like. Moreover, in certain example embodiments the metal member may have a coefficient of expansion similar to that of the glass substrates, with or without coated surface(s). In certain example embodiments, the provision of the at least one metal member in the edge seal, between the glass substrates, is advantageous in that this provides for a more flexible edge seal permitting more give and take during window flexing in different environmental conditions. The additional flexibility of the edge seal can reduce the amount of optical distortion caused by flexing of the window, and may also reduce the likelihood of window breakage in certain environmental conditions.

In certain example embodiments of this invention, there is provided a thermally insulating glass panel comprising: first and second spaced apart glass substrates defining a low pressure space therebetween having a pressure less than atmospheric pressure; a plurality of spacers disposed between said first and second glass substrates in order to space the substrates from one another; and a hermetic edge seal disposed at least partially between said first and second glass substrates for hermetically sealing said low pressure space, wherein said edge seal comprises at least one substantially U-shaped metal member that is bonded to each of the first and second glass substrates.

In other example embodiments of this invention, there is provided a thermally insulating glass panel comprising: first and second spaced apart glass substrates defining a low pressure space therebetween having a pressure less than atmospheric pressure; a plurality of spacers disposed between said first and second glass substrates in order to space the substrates from one another; and a hermetic edge seal disposed at least partially between said first and second glass substrates for hermetically sealing said low pressure space, wherein said edge seal comprises first and second metal members that are bonded to each other to form a laminate which is bonded to the first and second glass substrates.

In still further example embodiments of this invention, there is provided a thermally insulating glass panel comprising: first and second spaced apart glass substrates defining a low pressure space therebetween having a pressure less than atmospheric pressure; a plurality of spacers disposed between said first and second glass substrates in order to space the substrates from one another; and an edge seal disposed at least partially between said first and second glass substrates for hermetically sealing said low pressure space, wherein said edge seal comprises at least one metal member that does not directly contact either of the glass substrates and which is continuous and forms a ring around and/or proximate an entire periphery of the panel.

IN THE DRAWINGS

DETAILED DESCRIPTION OF CERTAIN EXAMPLE EMBODIMENTS OF THIS INVENTION

Figure 2:
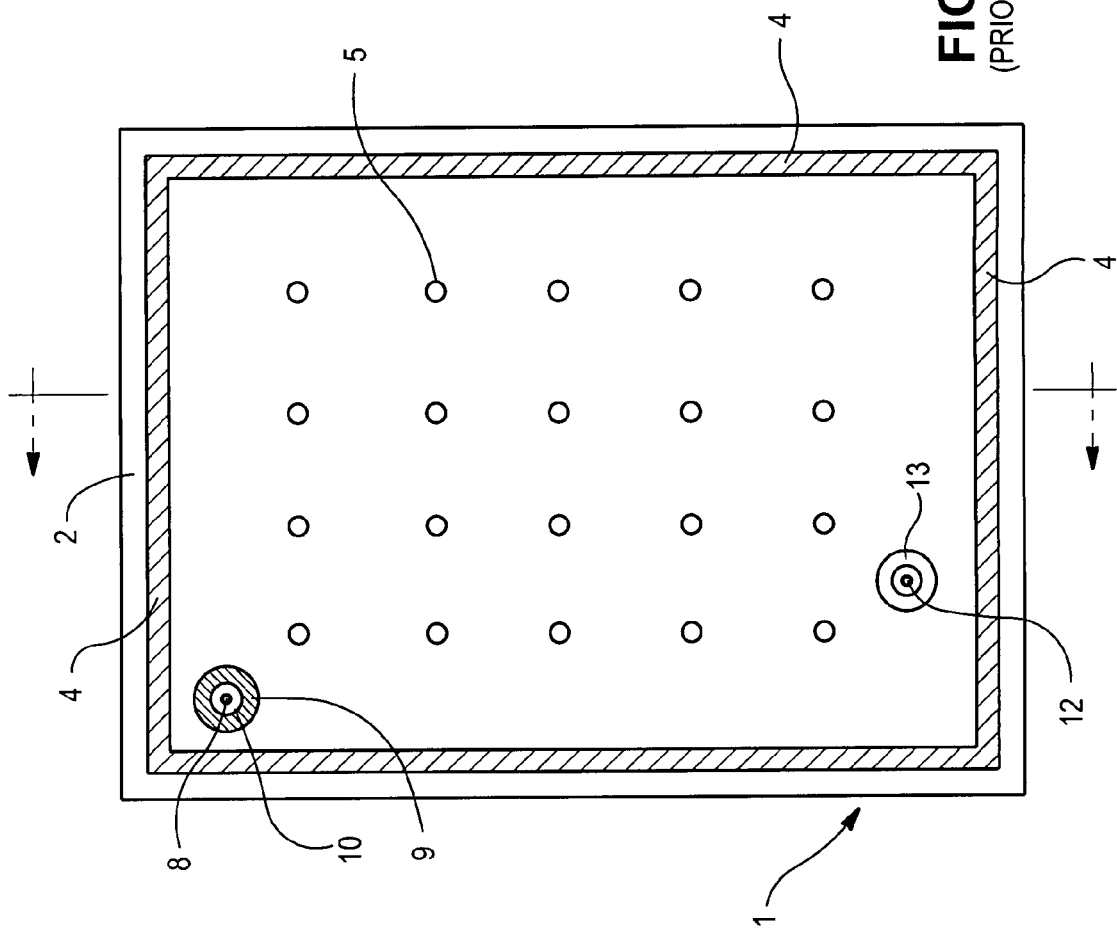
FIG. 2 is a prior art top plan view of the FIG. 1 vacuum IG unit, taken along the section line illustrated in FIG. 1 with the peripheral or edge seal being shown in cross-section.

Referring now more particularly to the accompanying drawings in which like reference numerals indicate like parts throughout the several views.

Figure 3:
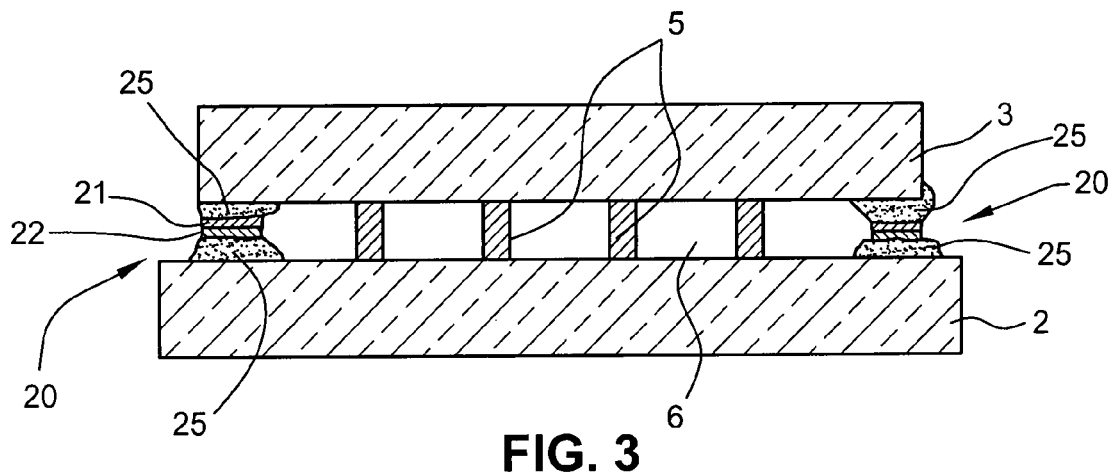
FIG. 3 is a cross sectional view of a vacuum IG unit according to an example embodiment of this invention.
Figure 4:
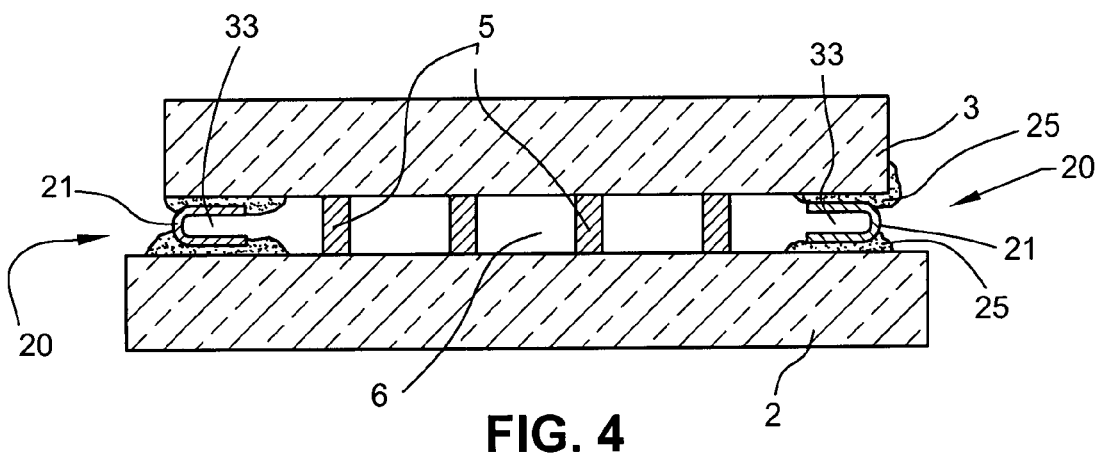
FIG. 4 is a cross sectional view of a vacuum IG unit according to another example embodiment of this invention.
Figure 5:
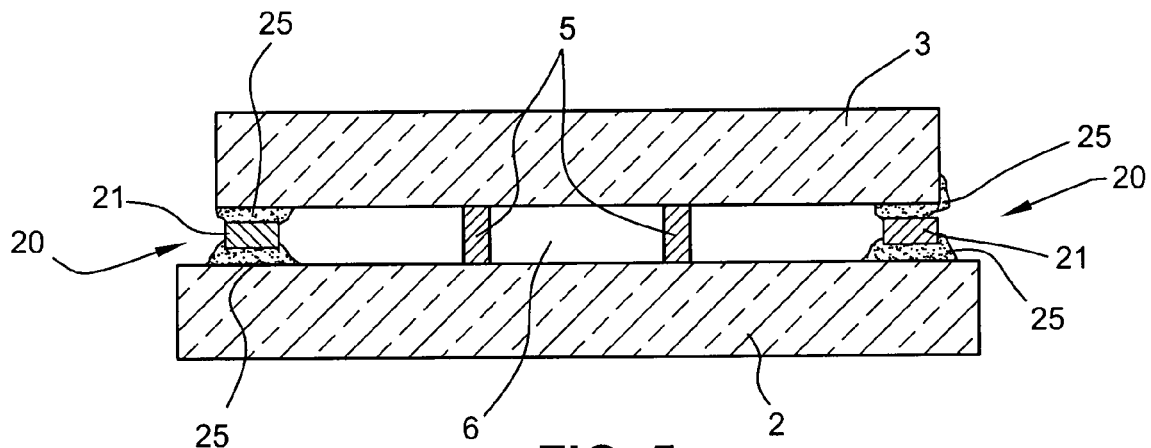
FIG. 5 is a cross sectional view of a vacuum IG unit according to yet another example embodiment of this invention.

FIGS. 3-5 are cross sectional views illustrating vacuum IG window units according to different example embodiments of this invention. The top view may be similar to that shown in FIG. 1 in certain example instances, for purposes of example and without limitation. Thus, the edge seal 20 may be provided around all sides of the VIG unit in certain example instances. Because interior space 6 between the opposing substrates 2, 3 is at a pressure lower or less than atmospheric in general, this type of panel is often referred to as a vacuum insulating glass (IG) or VIG unit. An optional pump out tube or hole (not shown) may be disposed in a hole or aperture formed in either one of the substrate or the edge seal in certain example instances, for permitting the space 6 to be evacuated to low pressure. Edge seal 20 hermetically seals the low pressure space 6 between the substrates 2, 3 in certain example embodiments.

Referring to FIGS. 3-5, in certain example embodiments, an edge seal 20 of a vacuum IG window unit includes at least one metal member 21 and/or 22 located between the opposing substrates 2 and 3 (e.g., glass substrates). In certain example embodiments, the metal member 21 and/or 22 need not directly contact the glass substrates 2 and/or 3. In certain example embodiments, the metal member 21 and/or 22 is bonded to the glass substrate(s) 2 and/or 3 via an adhesive or bonding material 25 such as solder glass, solder glass frit, and/or the like. Moreover, in certain example embodiments the metal member 21 and/or 22 may have a coefficient of expansion similar to that of one or both of the glass substrates 2, 3, with or without coated surface(s).

In certain example embodiments, the provision of the at least one metal member (which may or may not be a metal alloy) 21 and/or 22 in the edge seal 20, between the glass substrates 2 and 3, is advantageous in that this provides for a more flexible edge seal 20 permitting more give and take during window flexing in different environmental conditions (e.g., windy conditions, hot/cold temperature changes, etc.). This additional flexibility of the edge seal 20 can reduce the amount of optical distortion caused by flexing of the window, and may also reduce the likelihood of window breakage in certain environmental conditions.

In certain example embodiments of this invention, the VIG unit is provided with a metal or metal alloy member(s) 21/22 inclusive edges seal 20 with a similar coefficient of expansion to soda-lime-silica based glass which may be used for one or both of the glass substrates 2, 3. A low temperature ceramic frit 25, which may be applied in semi-liquid, liquid, paste and/or slurry form to the glass, can be used to bond the metal member 21 and/or 22 to the glass 2 and/or 3. The use of such a material for the edge seal may optionally permit lower processing temperatures to be used; this in turn may optionally allow for the use of commercially processed thermally tempered glass, with or without a low-E coated surface(s), to be used for substrate(s) 2 and/or 3. In certain example embodiments, the heating process used to seal the metal inclusive edge seal 20 may allow the use of tempered glass for substrate(s) 2 and/or 3, without losing substantial temper properties during the fabrication process.

"Peripheral" and "edge" seals herein do not mean that the edge seals 20 must be located at the absolute periphery of the unit, but instead mean that the edge seal is at least partially located at or near (e.g. within about two inches) an edge of at least one substrate of the unit and may or may not be located at the absolute edge periphery of the unit.

In certain example embodiments substrates 2 and/or 3 are substantially transparent to visible light (i.e. at least about 50% transparent, more preferably at least about 70% transparent, more preferably at least about 80% transparent, and most preferably at least about 90% transparent); although they may be deeply tinted in other embodiments. Edge seal 20 may be located entirely between the opposing substrates 2 and 3, or alternatively only partially between the substrates if the edge seal should happen to bulge or be squeezed outwardly to some degree during manufacture, or even possibly at least partly external to one or both substrates 2, 3.

Vacuum IG units such as those shown in FIGS. 3-5 according to different embodiments of this invention may be used as residential or commercial windows. The evacuation of space 6 eliminates or reduces heat transport between glass substrates 2 and 3 due to gaseous conduction and convection. In addition, radiative heat transport between glass sheets 2 and 3 can be reduced to a low level by providing a low emissivity (low-E) coating(s) (not shown) on the internal (or external) surface of one or both of sheets 2, 3. High levels of thermal insulation can thus be achieved. While the pressure in low pressure space 6 is generally less than atmospheric pressure, in certain embodiments the pressure in space 6 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. Edge seal 20 reduces or eliminates any ingress or outgress of gas or air to/from low pressure space 6. A plurality or an array of spacers 5 is provided between the substrates 2, 3 to space them from one another. Spacers 5 may be circular in shape, cylindrical in shape, rectangular in shape, oval in shape, round in shape, or linearly elongated in shape in different embodiments of this invention. Spacers 5 may be made of, for example, glass, sapphire, steel, metal or metal alloy, glass fibers, or any other suitable material in different embodiments of this invention.

Figure 1:
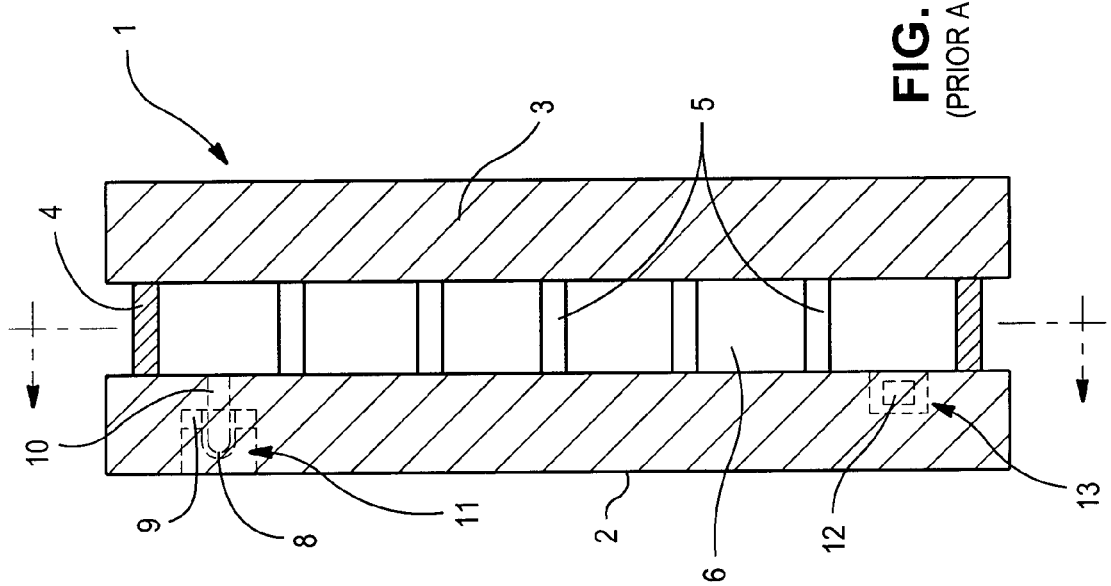
FIG. 1 is a prior art cross-sectional view of a conventional vacuum IG unit.

In the FIG. 3 embodiment, the edge seal 20 includes first and second metal (which includes a possible metal alloy) members 21 and 22. The metal members 21 and 22 may be substantially planar in shape in certain example embodiments, and may define planes substantially parallel to the glass substrates 2 and 3 in certain example embodiments. In making the VIG unit of FIG. 3, metal member 22 is bonded to glass substrate 2 via bonding material 25 (e.g., low temperature solder glass frit or the like), and metal member 21 is bonded to glass substrate 3 via another portion of bonding material 25. Each bonding material portion 25 may or may not be the same in certain example instances. Then, after the metal members 21 and 22 have been bonded to their respective corresponding glass substrates 3 and 2, the two glass substrates are brought toward each other and the metal members 21 and 22 are brought together and bonded to each other via laser welding, ultrasonic bonding, or the like, so as to ultimately form a laminated metal member in the final VIG unit. Again, this seal 20 may possibly extend around the entire periphery of the VIG unit in certain example embodiments, as shown in FIG. 1.

Metal members 21 and 22 may or may not be made of the same material in certain example embodiments. Example metals which may be used for member(s) 21 and/or 22 include stainless steel, Cr, alloys including these or other metals, or any other suitable metal. Small amounts of non-metals may also be present in the metal member(s) 21 and/or 22 in certain example instances.

In the FIG. 4 embodiment, a substantially U-shaped metal (which may be of a single metal or a metal alloy in different instances) member 21 is used and is bonded to both glass substrates 2 and 3 via a bonding material 25 such as solder glass frit. The substantially U-shaped metal member 21 includes first and second approximately parallel legs connected to each other via a base which may or may not be curved. Each leg of member 21 may be aligned substantially parallel to the adjacent glass substrate as shown in FIG. 4, in certain example embodiments of this invention. The substantially U-shaped metal member 21 may be aligned so that the open-side of the U faces inwardly toward low pressure space 6 in certain example instances as shown in FIG. 4, or alternatively in other example embodiments the open-side of the U may face outwardly away from space 6 in certain instances. The interior cavity 33 defined between the opposing legs of substantially U-shaped member may or may not be filled with bonding material 25 in different example embodiments of this invention. Filling or substantially filling of cavity 33 with bonding material 25 may be advantageous in certain example instances to provided additional stability to the edge seal, whereas not filling the cavity 33 with bonding material 25 may be advantageous in that additional flexibility of the edge seal may be provided. In the FIG. 4 embodiment, the member 21 may be bonded to substrate 2 first and thereafter to substrate 3, or vice versa, or alternatively may be bonded to both substrates 2, 3 at the same time in a common heating step for bonding material 25.

In the FIG. 5 embodiment, the metal member 21 is made up of a single metal member that is bonded to both substrates 2 and 3 via bonding material 25. The metal member 21 in the FIG. 5 embodiment may be fairly thick (e.g., thicker than 21 and 22 in the FIG. 3 embodiment for instance) in certain example embodiments. In the FIG. 5 embodiment, the metal member 21 may be bonded to substrate 2 first and thereafter to substrate 3, or vice versa, or alternatively may be bonded to both substrates 2, 3 at the same time in a common heating step for bonding material 25.

In each of the FIGS. 3-5 embodiments, the metal member 21 (and possibly 22) may be made of a continuous member that forms a ring around or proximate the entire periphery of the VIG unit as shown in FIG. 1. Alternatively, in other example embodiments, the metal member 21 may be made up of a plurality of connected or spaced apart different members in a given VIG unit. The metal members 21 and 22 preferably do not directly contact the glass substrates 2, 3 in certain example embodiments, although in alternative embodiments it is possible that member 21 and/or 22 may contact a glass substrate(s).

Figure 6:
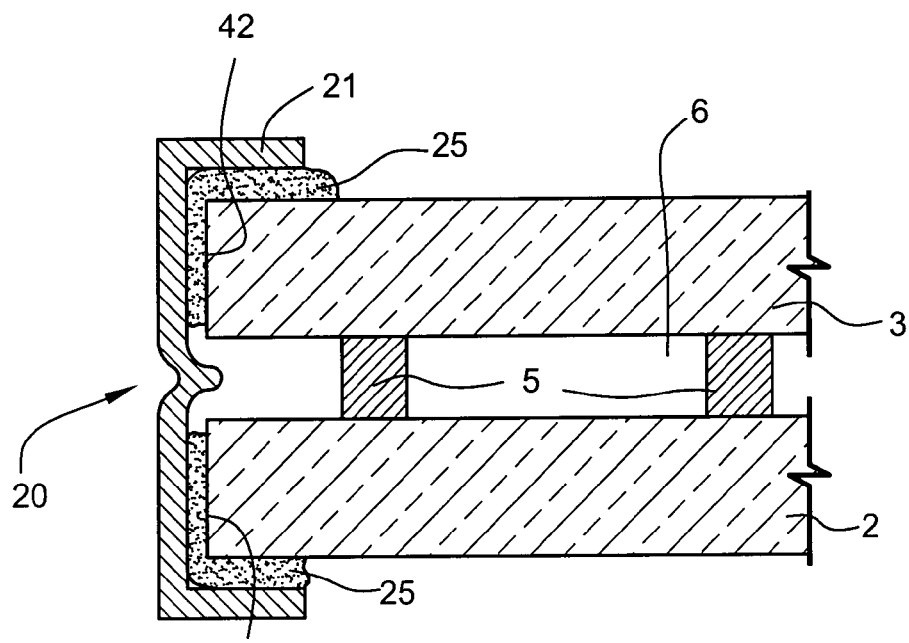
FIG. 6 is a cross sectional view of a vacuum IG unit according to another example embodiment of this invention.
Figure 7:
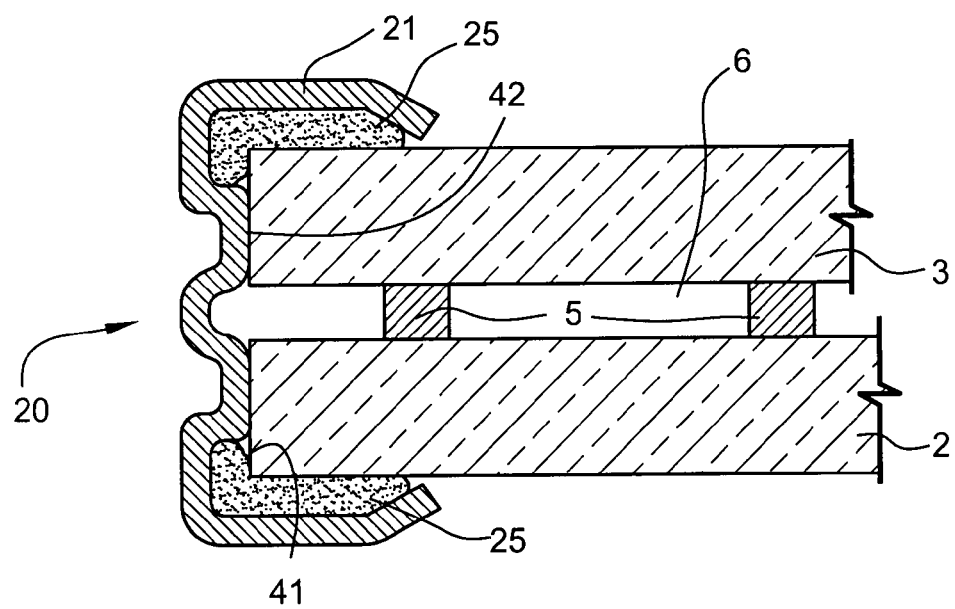
FIG. 7 is a cross sectional view of a vacuum IG unit according to another example embodiment of this invention.

FIGS. 6 and 7 are cross sectional views of vacuum IG window units according to other example embodiments of this invention. In the FIG. 6 embodiment and the FIG. 7 embodiment, the substantially U-shaped metal member(s) 21 is provided partially or even entirely exterior of the gap between the substrates 2 and 3. In FIGS. 6-7, the metal member 21 encapsulates the edges 41, 42 of the respective glass substrates 2, 3. In FIGS. 6-7, a substantial portion, or possibly all of, the metal member 21 is located so as to be not between the substrates 2 and 3. The length of the spacer may or may not be crimped, dimpled, or the like in order to facilitate expansion and/or contraction longitudinally or perpendicular to the glass edge.

It is noted that the metal member 21 may be made by providing a plurality of different metal members one along each side of the panel, and welding or otherwise joining the metal members at or proximate corners of the panel in order to form one metal member 21. Moreover, a roll forming process may or may not be used in order to shape the member(s) 21 to desired length(s).

In certain example embodiments, the solder glass or frit may be pre-applied to the metal and/or glass surfaces, pre-fired, and then the member(s) 21 may be applied to the glass and re-firing in order to fuse the pre-applied frit. This may be used to shorten the heat cycle in order to bond the frit between the metal and glass.

Once given the above disclosure, many other features, modifications, and improvements will become apparent to the skilled artisan. Such other features, modifications, and improvements are, therefore, considered to be a part of this invention, the scope of which is to be determined by the following claims.

The invention claimed is:

1. A thermally insulating glass panel comprising:
first and second spaced apart glass substrates defining a low pressure space therebetween having a pressure of equal to or less than about $0.5 \times 10^{-3}$ Torr;
a plurality of spacers disposed between said first and second glass substrates in order to space the substrates from one another; and
a hermetic edge seal disposed at least partially between said first and second glass substrates for hermetically sealing said low pressure space, wherein said edge seal comprises at least one substantially U-shaped metal member that is bonded to each of the first and second glass substrates, wherein said substantially U-shaped member includes first and second approximately parallel legs that are connected to each other with a base, wherein the first and second legs are bonded to respective inner surfaces the first and second glass substrates using solder glass, where the solder glass is provided between each of the legs and the inner surfaces of the glass substrates and extends along and contacts at least part of the base, wherein said base is either substantially straight or slightly curved, and wherein said substantially U-shaped member is oriented so that an open side of the substantial U-shape faces inwardly toward the low pressure space.

2. The panel of claim 1, wherein said substantially U-shaped member is oriented so that an open-side of the substantial U-shape faces outwardly away from the low pressure space.

3. The panel of claim 1, wherein substantially U-shaped member is continuous and forms a ring around and/or proximate the entire periphery of the panel.

4. The panel of claim 1, wherein the substantially U-shaped metal member is bonded to at least one of the first and second glass substrates using low temperature ceramic frit.

5. A thermally insulating glass panel comprising:
first and second spaced apart glass substrates defining a low pressure space therebetween having a pressure less than or equal to about $10^{-6}$ Torr;
a plurality of spacers disposed between said first and second glass substrates in order to space the substrates from one another; and
a hermetic edge seal disposed at least partially between said first and second glass substrates for hermetically sealing said low pressure space, wherein said edge seal comprises at least one substantially U-shaped metal member that is bonded to each of the first and second glass substrates using at least a solder glass.

6. The panel of claim 5, wherein at least a substantial portion of the substantially U-shaped metal member is not located between the first and second glass substrates.

7. The panel of claim 5, wherein the substantially U-shaped metal member encapsulates at least parts of peripheral edges of both the first and second glass substrates.

8. The panel of claim 5, wherein said substantially U-shaped member includes first and second approximately parallel legs that are connected to each other with a base, and wherein the first leg is bonded to the first glass substrate and the second leg is bonded to the second glass substrate.

9. The panel of claim 5, wherein said substantially U-shaped member is located substantially between the first and second glass substrates and is oriented so that an open-side of the substantial U-shape faces inwardly toward the low pressure space.

10. The panel of claim 5, wherein the substantially U-shaped metal member is bonded to each of the first and second glass substrates using solder glass.

\* \* \* \* \*